United States Patent [19]

Demko

[11] 4,300,479
[45] Nov. 17, 1981

[54] RACING PIGEON CAGE

[76] Inventor: David J. Demko, R.D.#3 Box 232, Reading, Pa. 19606

[21] Appl. No.: 151,392

[22] Filed: May 19, 1980

[51] Int. Cl.³ .................... A01K 31/06; A63K 3/02
[52] U.S. Cl. .................... 119/15.6; 119/97 R; 49/41
[58] Field of Search .................... 119/15.6, 17, 29, 50, 119/97 R; 49/38, 41; 221/82

[56] References Cited

U.S. PATENT DOCUMENTS

| | | | |
|---|---|---|---|
| 521,839 | 6/1894 | Westbay et al. | 221/82 |
| 1,680,130 | 8/1928 | Conner | 221/82 X |
| 2,574,765 | 11/1951 | Smith | 119/97 R |
| 2,681,040 | 6/1954 | Kniesteadt | 119/97 R |
| 3,826,231 | 7/1974 | Crawford et al. | 119/51.12 |
| 4,204,611 | 5/1980 | Graves | 221/82 X |

*Primary Examiner*—Gene Mancene
*Assistant Examiner*—Robert P. Swiatek
*Attorney, Agent, or Firm*—William J. Ruano

[57] ABSTRACT

A racing pigeon cage or single toss machine having an outer squirrel-cage-like shroud which is driven and rotated relative to a stationary housing having radial partitions to provide individual stalls for the pigeons. One or more of the staves or posts forming the shroud of the cage are omitted at one location so that as such location passes individual stalls, the pigeon or pigeons can exit in succession and fly to their destination, or if the shroud is made of other material such as sheet metal for example, an opening is left in the sheet metal so the birds can exit as the opening passes. The speed of rotation of the shroud may be varied to adjust the time interval of the opening of successive stalls. An electric motor or a spring motor may be used to drive the shroud with a timer to vary the period for successive opening of the stalls.

7 Claims, 4 Drawing Figures

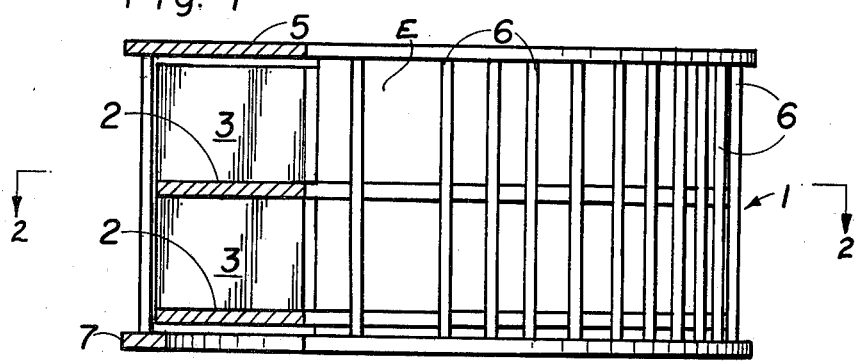
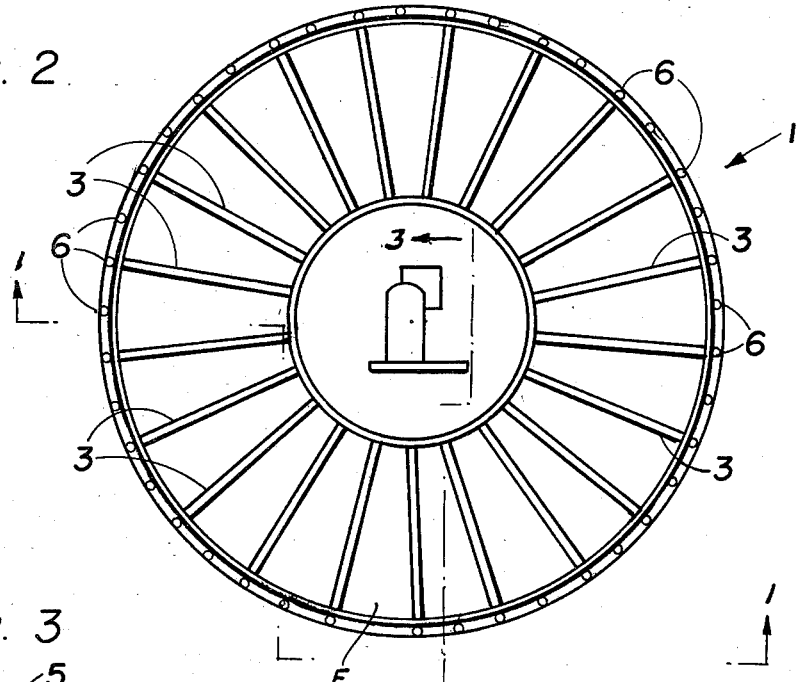
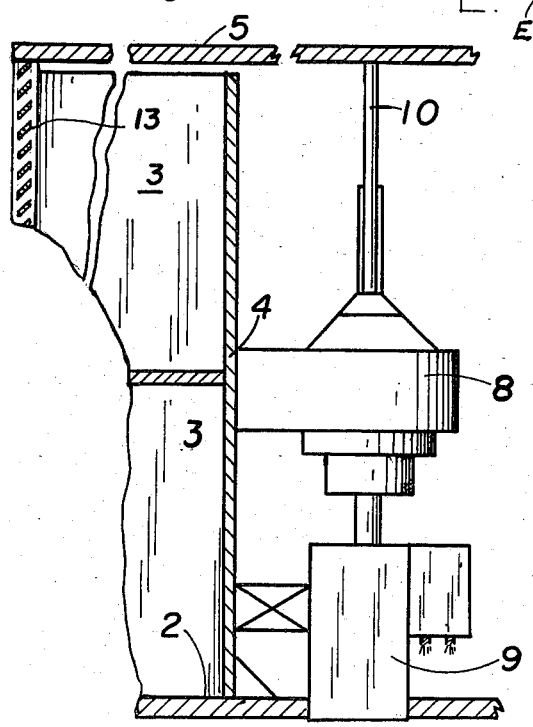
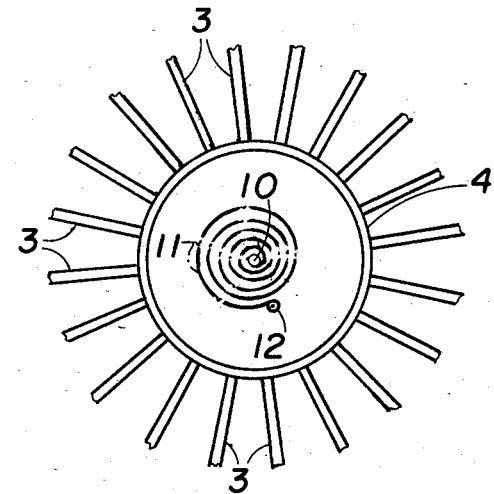

RACING PIGEON CAGE

This invention relates to a cage or training basket especially adapted for racing pigeons.

An outstanding disadvantage of the use of conventional training baskets for racing pigeons is that when the basket is open, the pigeons will all try to gain exit at the same time through the single door opening and fly out at the same time causing the majority of the group to follow the leaders on the trip home instead of navigating the course with their own mental abilities.

An object of my invention is to provide a mechanical cage or training basket that will overcome the above mentioned disadvantage.

A more specific object of my invention is to provide a novel cage especially adapted for racing pigeons to enable them to exit the cage singly, doubly, triply, etc, instead of together, at timed intervals.

Another object is to provide a rotatable element of the cage which can be driven either by an electric motor, or by a spring motor if used away from a source of electrical power.

Other objects and advantages of the invention will become more apparent from the following description taken from the accompanying drawing wherein;

FIG. 1 is an elevational view, partly in cross-section, of a cage embodying the principles of the present invention and taken along the broken line 1—1 of FIG. 2;

FIG. 2 is a cross-sectional view taken along line 2—2 of FIG. 1;

FIG. 3 is a fragmentary, cross-sectional view taken along line 3—3 of FIG. 2; and FIG. 4 is a fragmentary top view to FIG. 2 except showing a spring motor instead of an electric motor.

Referring more particularly to the drawing, numeral 1 generally denotes a cage or crate especially adapted for racing pigeons or similar birds and embodying the present invention.

The cage comprises a stationary base 2 on which is mounted a two, three or four etc. floored stationary platform 2, 2 to provide two levels for the pigeons. Each floor has plurality of radial partitions 3, 3 of plastic or any other suitable material, forming spaces therebetween to accomodate a single pigeon in each space 3, 3. Surrounding the periphery of the stationary platform 2, 2, is a rotatable shroud comprising vertical dowel rods 6, or sheet metal or any other suitable material spaced about the periphery and a cover or top 5 integral therewith. Louvered sheet metal or flexible fiber glass 13 may be substituted for rods 6.

On the stationary base 2 is mounted a driving electric motor 8, D.C. or A.C., supported on a pedestal 9 and having a vertical drive shaft 10 which drives cover 5 and shroud 6.

It will be noted that gap E exists in the shroud 6, by omitting one or more rods or letting a space sufficiently wide for a pigeon to exit. Thus, as there is relative movement between the shroud 6 and the platform 2, 2, a sufficiently large opening exists so that the pigeon contained in the adjoining space or stall can fly out of the cage or training crate as the motor drives the shroud, whereupon successive stalls in which different pigeons are located are opened to permit the exit of the pigeons in succession.

If a spring motor is used an electronic timer is used in conjunction with the spring to regulate the movement of the shroud 6 and cover 5 at the desired time interval. Thus, they may fly away at timed intervals, regulated by the speed of the motor.

In cases where no electric power is readily available, a conventional spring motor 11, 12 is provided, as shown in FIG. 4. Or perhaps both the motor and the spring motor may be selectively used. The spring motor 11, 12 may be wound by turning the top shroud or cover 5 and 6 and then releasing at which a timer could regulate how slowly the cage will unwind.

Thus, it will be seen that I have provided an efficient cage or training crate to allow racing pigeons to exit the cage in succession, rather than all at once; also I provided a double tiered cage that could be increased by additional tiers if desired, furthermore, I have provided either an electric motor or a spring motor as the power source for rotating the shroud relative to the stationary part of the housing.

While I have illustrated and described a single specific embodiment of my invention, it will be understood that this is by way of illustration only and that various changes and modifications may be contemplated in my invention and within the scope of the following claims.

I claim:

1. A training crate for racing pigeons and the like comprising a stationary round base platform having radially extending partitions supported thereon to provide individual stalls for said pigeons, a motor mounted on said base platform and a foraminous cylinder surrounding the outer periphery of said platform and being driven by said motor, said cylinder having an opening large enough to allow exiting of a pigeon when driven past said stalls, in succession, to allow successive pigeons to exit in timed succession.

2. A training crate as recited in claim 1 wherein said foraminous cylinder is in the form of a squirrel-cage-like structure or shroud wherein an opening is left at one location of the periphery to allow exiting of a single pigeon at a time.

3. A training crate as recited in claim 1 wherein said foraminous cylinder includes louvers.

4. A training crate as recited in claim 1 wherein said foraminous cylinder is in the form of a perforated sheet metal shroud.

5. A training crate as recited in claim 1 wherein said motor is an electric motor.

6. A training crate as recited in claim 1 wherein said motor is in the form of a spring motor which is wound by rotating said cylinder and, when the cylinder is unwinding, at timed intervals, the opening in the cylinder will allow the exit of the birds.

7. A training crate as recited in claim 1 together with a vertically spaced second platform above said base platform having radially extending partitions to form a second tier of stalls.

* * * * *